United States Patent Office 3,452,651
Patented July 1, 1969

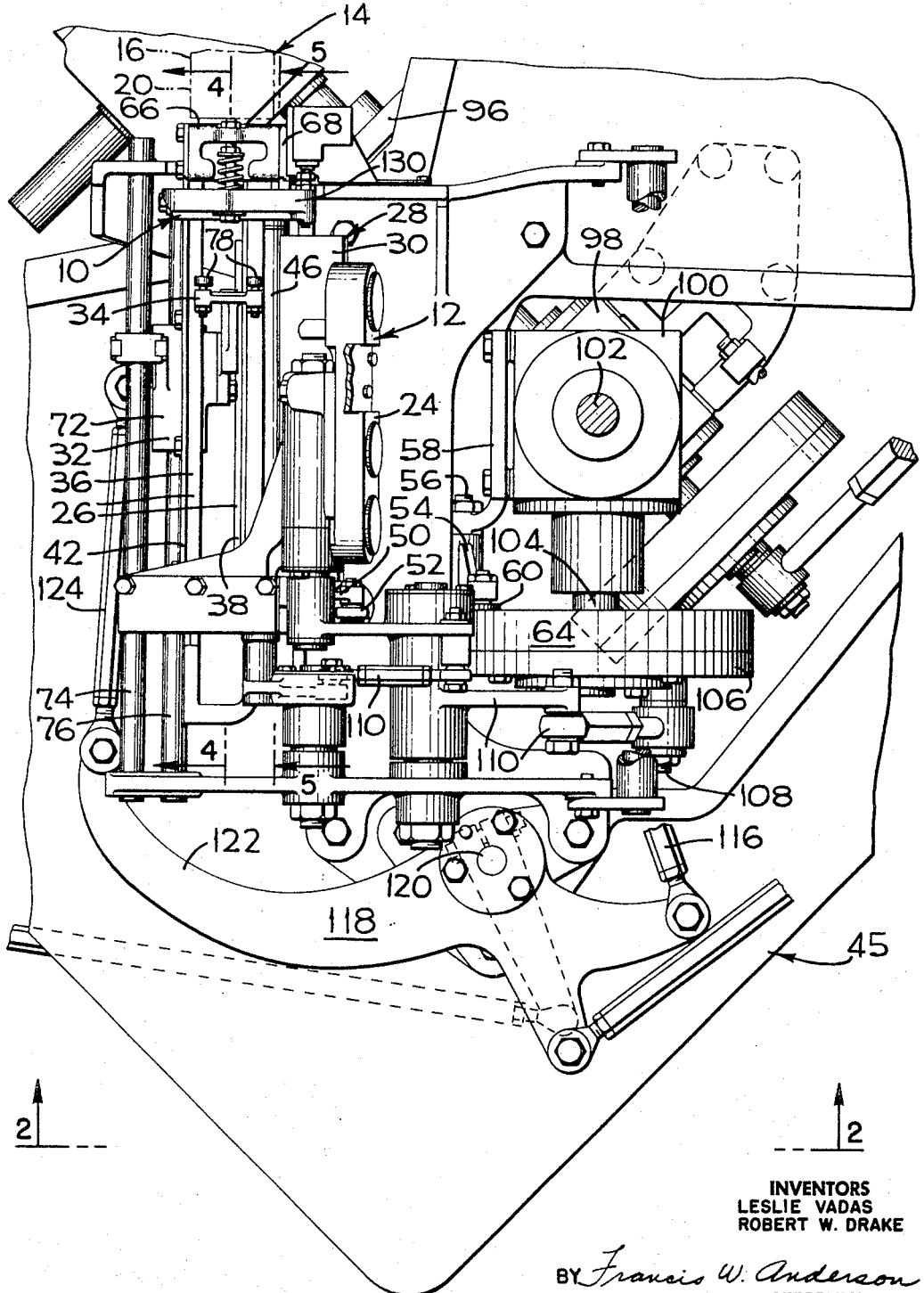

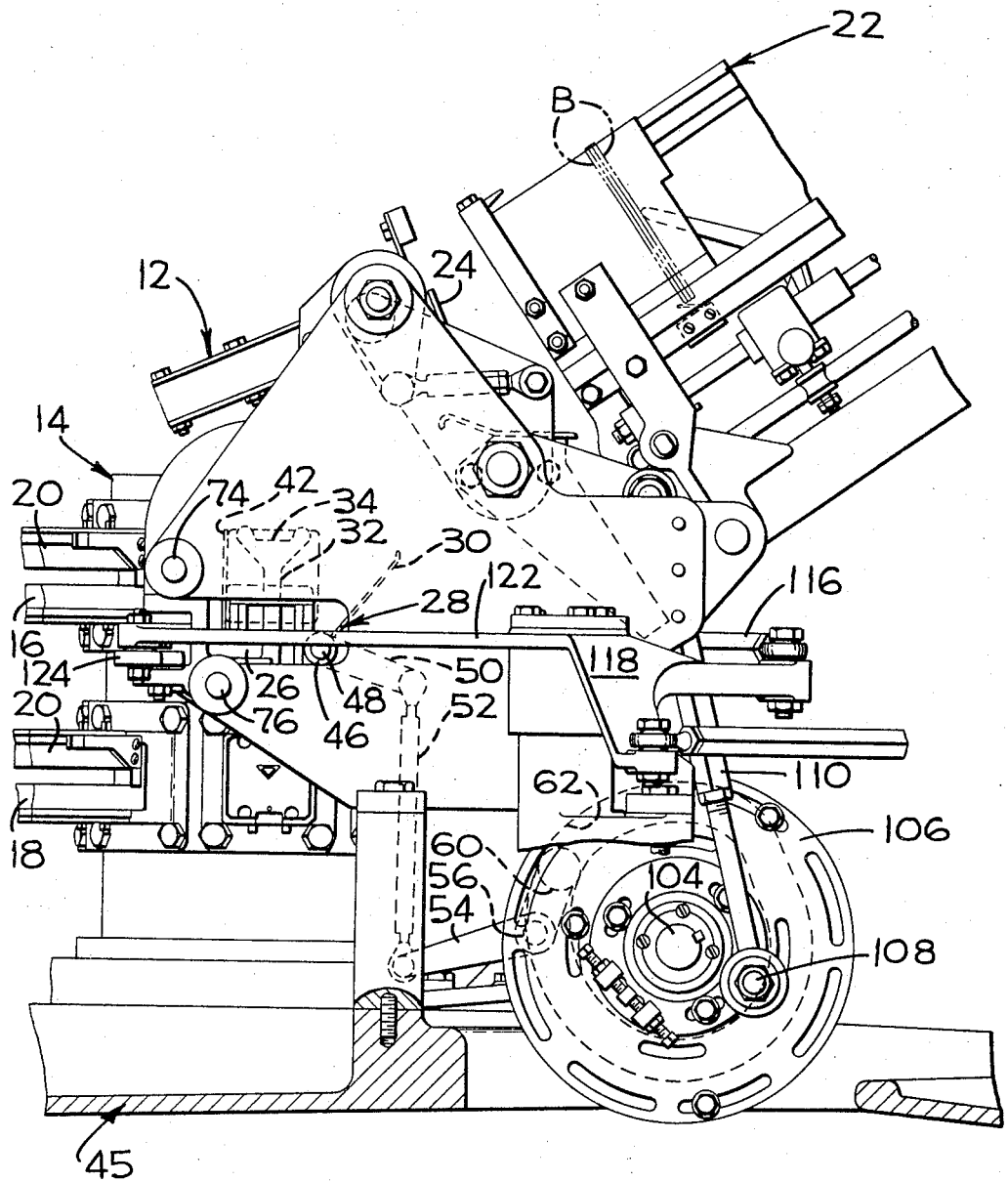
FIG_2

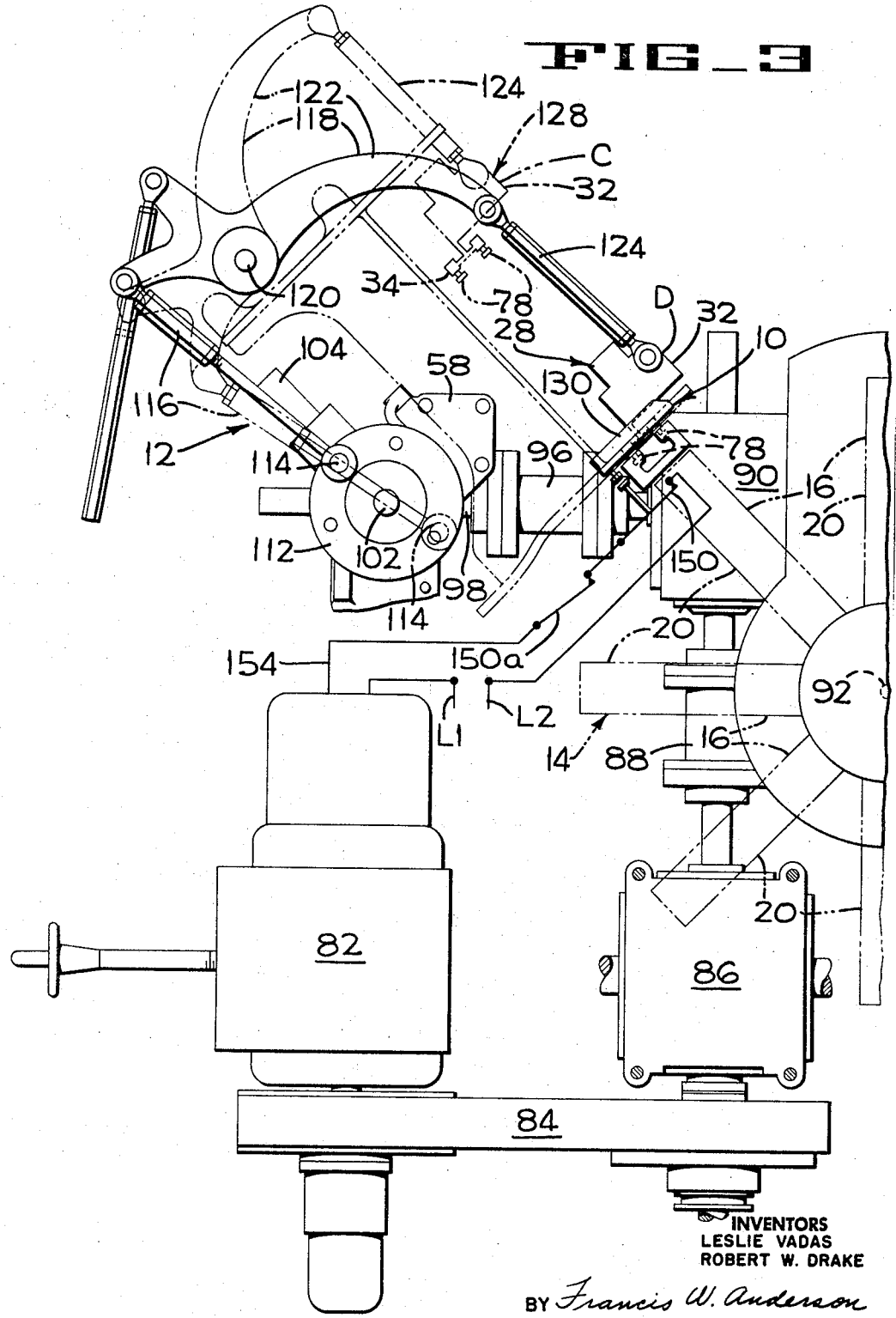

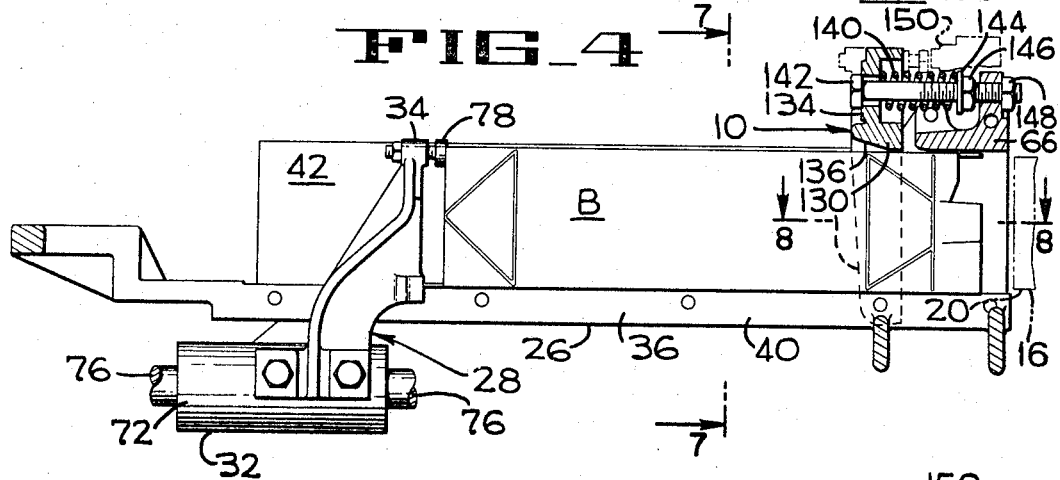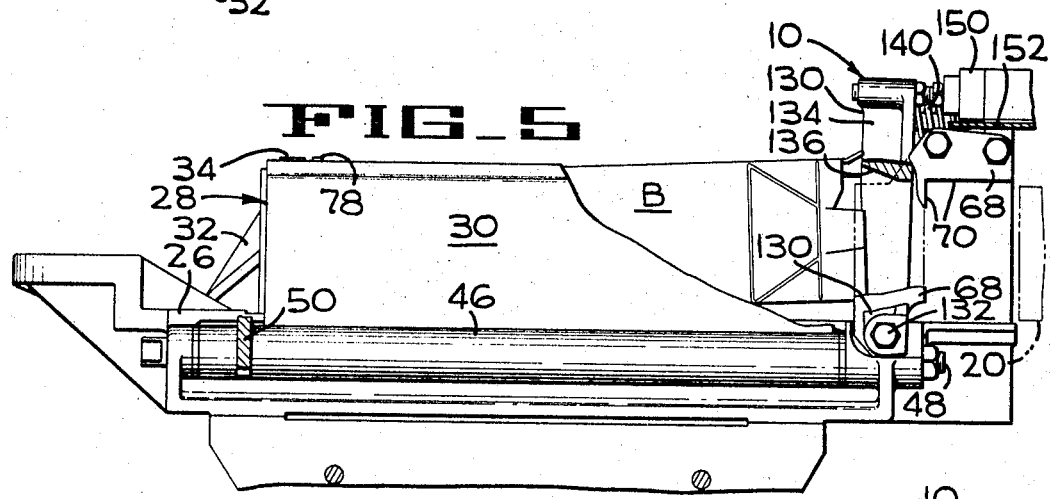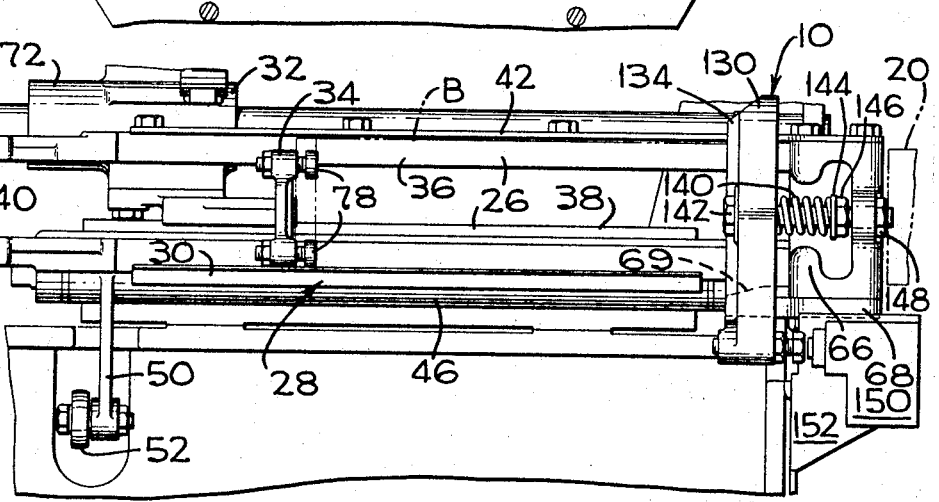

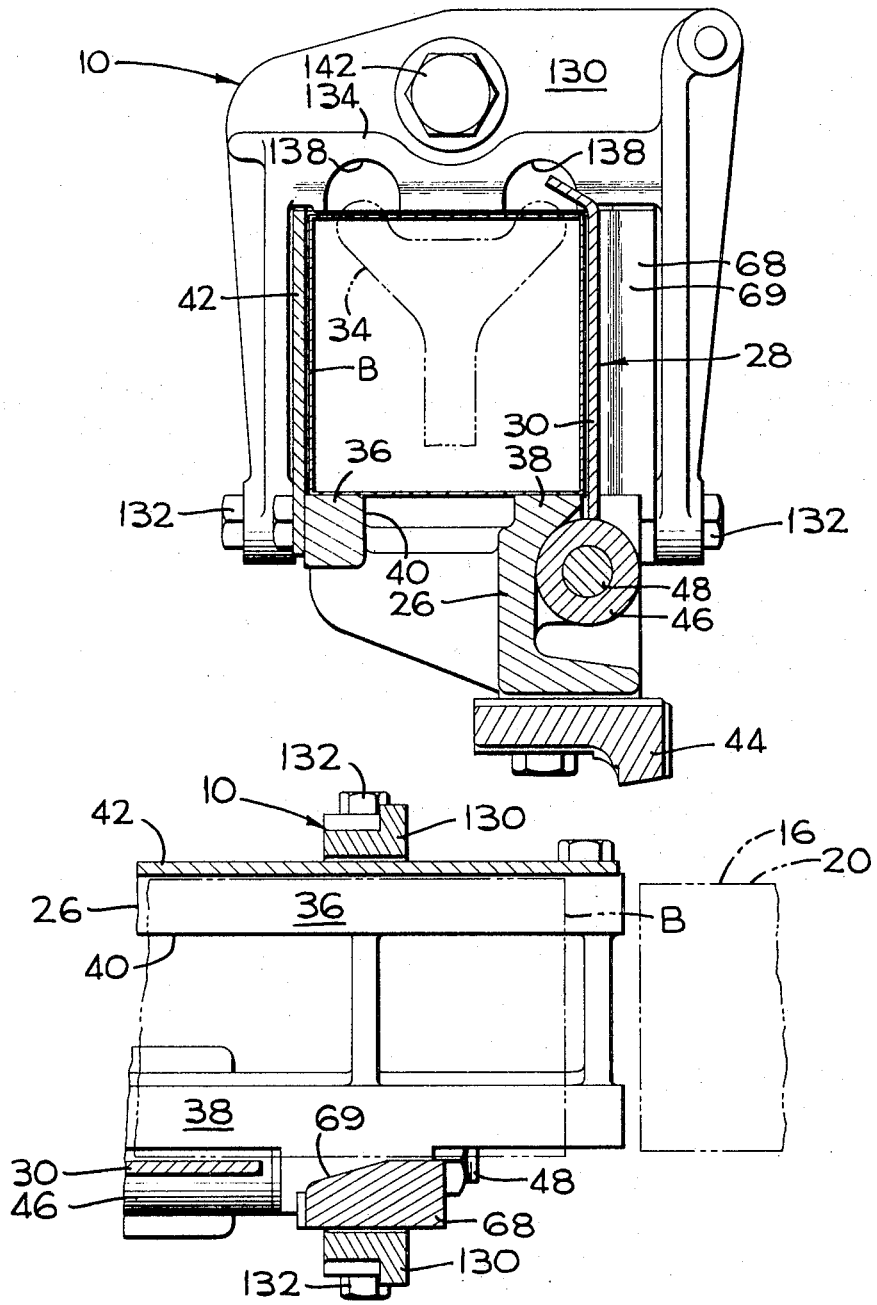

3,452,651
CONTAINER ALIGNING JAM DETECTOR
Leslie Vadas, Los Gatos, and Robert W. Drake, San Jose, Calif., assignors to FMC Corporation, San Jose, Calif., a corporation of Delaware
Filed Feb. 17, 1966, Ser. No. 528,206
Int. Cl. B31b 1/04, 1/94; B65b 57/04
U.S. Cl. 93—36         7 Claims

ABSTRACT OF THE DISCLOSURE

A container aligning jam detector disposed adjacent the path of movement of aligned containers and selectively adjustable to resiliently resist movement of misaligned containers with a predetermined force in an attempt to correct alignment of slightly misaligned containers as they move therepast. The detector moves into machine stopping position in the event the resilient resisting force is insufficient to move a misaligned container into alignment.

---

The present invention pertains to container forming and filling machines and more particularly relates to a container aligning jam detector on a container forming machine for detecting the presence of mispositioned cartons and for interrupting the operation of the machine in the event mispositioned containers are detected and avoid alignment.

Although other types of containers may be handled by the detector, the containers hereinafter will be referred to as cartons.

In carton forming and filling machines of the type disclosed in the pending application of Vadas et al. Ser. No. 461,738, which is assigned to the assignee of the present invention, folded carton blanks stored in a magazine are erected from a flat folded condition to an open ended rectangular tubular condition. These tubular carton blanks of rectangular cross-section are then pushed onto mandrels which are intermittently indexed in axial alignment with the tubular blanks, and which thereafter intermittently move the blanks past processing stations which cooperate to seal the bottom closure of the blanks.

Because the material from which the cartons are made is quite stiff and tends to return the carton blanks to the flat folded condition, it has been difficult to consistently maintain each carton in squared condition and in alignment with the mandrel upon which it is to be placed. If an occasional carton is not accurately aligned with the associated mandrel, the misaligned carton may become damaged when it is transferred onto the mandrel thereby resulting in a defective carton, or the carton may entirely avoid being placed on the mandrel with the result that parts of the machine may be damaged.

It is, therefore, one abject of the present invention to provide a carton jam detector.

Another object is to provide a jam detector which aids in aligning a carton with a mandrel when the carton is being pushed onto the mandrel.

Another object is to provide a carton aligning jam detector which may be selectively adjusted to resiliently resist movement of misaligned cartons therepast with predetermined forces prior to being moved into machine stopping position.

These and other objects and advantages of the present invention will become apparent from the following description and the accompanying drawings in which:

FIGURE 1 is a plan of a carton erecting and loading mechanism with which the carton aligning jam detector on the present invention is associated, certain parts being cut away.

FIGURE 2 is an elevation of the apparatus of FIGURE 1 taken looking in the direction of arrows 2—2 of FIGURE 1 and illustrating a fragment of a turret having an upper and a lower row of mandrels thereon and a magazine for supplying cartons to the mandrels in the upper row.

FIGURE 3 is a diagrammatic plan illustrating the drive for the carton erecting and loading mechanism, and illustrating the wiring diagram of the aligning jam detector.

FIGURE 4 is a vertical section taken along lines 4—4 of FIGURE 1 illustrating an aligned carton being pushed through the aligning jam detector.

FIGURE 5 is a vertical section taken substantially along lines 5—5 of FIGURE 1 showing a misaligned carton activating the jam detector, certain parts being cut away.

FIGURE 6 is a plan of FIGURE 5 illustrating a properly aligned carton being pushed through the aligning jam detector.

FIGURE 7 is an enlarged vertical transverse section taken along lines 7—7 of FIGURE 4.

FIGURE 8 is an enlarged horizontal section taken along lines 8—8 of FIGURE 4.

The aligning jam detector 10 (FIG. 1) is associated with a carton erecting and loading mechanism 12 of a carton forming and filling machine of the type disclosed in the aforementioned Vadas et al. application. In the Vadas et al. application a horizontal carton forming turrent 14 (FIGS. 1, 2 and 3) having an upper series 16 and a lower series 18 (FIG. 2) of mandrels 20 projecting radially outward therefrom is provided, and each series of mandrels is adapted to receive cartons from an associated upper and lower erecting and loading mechanism. Since the parts associated with the lower series of mandrels are substantially the same as those associated with the upper series of mandrels, only those parts associated with the upper series 16 of mandrels 20 will be shown and described herein. It will be understood, however, that an aligning jam detector that is similar to the detector 10 will be associated with the parts for feeding cartons onto the lower mandrels and that actuation of the aligning detector will cause stopping of the carton feeding operation of the carton forming and filling machine.

In general, a magazine 22 (FIG. 2) is provided for supporting a plurality of flat folded carton blanks B which are engaged one at a time by a suction head 24 of the erecting and loading mechanism 12 and are pulled out of the magazine, are overbent, and are subsequently placed on a transfer table 26 of a mandrel loader 28. A pivotal carton squaring gate 30 then closes against the squared carton on the table 26, and the mandrel loader 28 pushes the carton, if properly aligned, past the aligning jam detector 10 onto an associated one of the upper mandrels 20, which mandrel is indexed at a feed station in alignment with the mandrel loader 28.

The mandrel loader 28 includes the pivotal gate 30 which pivots from an inclined position (FIG. 2) to a vertical position (FIG. 7) to first receive the carton blank B and thereafter hold the blank in squared position as it is being moved onto the associated upper mandrel 20. A reciprocable pusher 32 (FIGS. 1, 4 and 6) having a Y-shaped pusher finger 34 bolted thereon is provided for pushing the squared carton blank onto the particular upper mandrel 20 that is indexed at the feed station in alignment with the mandrel loader 28.

As shown in FIGURES 4 to 8, the squared carton blank B is received upon the support table 26 which is defined by a pair of spaced support rails 36 and 38 having a slot 40 therebetween. A vertically extending fixed carton squaring gate 42 is bolted to the rail 36 and projects upwardly therefrom to engage one wall of the squared carton blank. The table 26 is of one-piece cast construction and is bolted to an angle bracket 44 (FIG. 7) which is, in turn, supported by the frame 45 of the carton erecting and loading mechanism 12.

The pivotal gate 30 is welded to a tubular shaft 46 which is journalled on a fixed shaft 48 that is secured to the table 26 adjacent the rail 38. A lever arm 50 (FIG. 2) is secured to and projects outwardly from the tubular shaft 46 and has its free end pivotally connected to one end of an adjustable link 52. The other end of the adjustable link 52 is pivotally connected to one end of a bell crank 54 (FIG. 2), which is journalled on a bolt 56 that is secured to a bracket 58 (FIG. 3) bolted to the frame 45 of the mechanism 12. A cam follower 60 (FIG. 2) is journalled on the other end of the bell crank 54 and rides in a cam groove 62 in a face cam 64 (FIG. 1) thereby actuating the gate 30 in timed relation with the movement of the suction head 24.

With the carton blank held in the squared position by the fixed squaring plate 42, the pivotal gate 30 and the rails 36 and 38; the reciprocable pusher 32 engages the carton blank and pushes it, if aligned, through the detector 10 and past an upper guide 66 (FIGS. 4–6). The guide 66 is bolted to an upwardly directed extension of the fixed squaring plate 42 and to a side plate 68 which is, in turn, bolted to the frame 45. The side plate 68 has a beveled leading edge 69 and terminates in a slot 70 which is spaced from the end of the associated mandrel 20 a distance sufficient to permit the bottom closure of the carton blank, which bottom closure projects outwardly from the mandrel, to swing freely out past the plate 68 as the turret is driven to index another mandrel into alignment with the loader 28.

The reciprocable pusher 32 comprises a main body 72 which is rotatably mounted on shafts 74 and 76 that extend transversely of the frame 45 and are rigidly secured thereto. The Y-shaped finger 34 (FIGS. 1 and 4) is bolted to the body 72 and projects upwardly through the slot 40 of table 26. Flat faced pusher bolts 78 are screwed into the upper end portions of the Y-shaped finger 34 and are locked in desired position by nuts. The bolts 78 engage the uppermost edge of the bottom closure of the carton blank B and, upon reciprocation of the pusher 32, push the squared blank onto the associated mandrel 20.

As best shown in FIGURES 1, 2 and 3, the carton forming turret 14, the suction head 24, the pivotal squaring gate 30, and the pusher 32 are driven in timed relation by a variable speed drive motor 82 (FIG. 3). The drive motor 82, which includes a magnetic brake for immediately stopping the motor when it is de-energized, is connected by a belt drive 84 to a gear reducer 86. An output shaft of the gear reducer 86 is connected by a flexible coupling 88 to the input shaft of an intermittent driving unit 90, which unit has one output shaft 92 connected to the forming turret 14 thereby intermittently driving the turret 14.

A continuously rotating output shaft of the unit 90 is connected by a flexible coupling 96 to a lower right angle gear box 98 (FIG. 1). An upper output shaft (not shown) of the lower gear box 98 is coupled to the input shaft (not shown) of an upper right angle gear box 100, which includes a vertical output shaft 102 and a horizontal output shaft 104.

The aforementioned face cam 64 (FIGS. 1 and 2) is keyed to the horizontal shaft 104 and causes gate 30 to pivot between the open position shown in FIGURE 2 and the closed position shown in FIGURE 7 once for each revolution of the shaft 104. A crank disc 106, which has a crank pin 108 projecting outwardly therefrom, is also keyed to the horizontal shaft 104. The crank pin 108 is connected to the suction head 24 by a linkage 110, which linkage is fully disclosed in the aforementioned Vadas et al. application, and operates the suction head to pick one carton at a time from the magazine 22 and place the carton onto the table 26 of the mandrel loader 28 immediately before the pivotal squaring gate 30 is moved from the position shown in FIGURE 2 to the position shown in FIGURE 7.

The vertical output shaft 102 (FIG. 3) of the upper gear box 100 has a crank disc 112 keyed thereto with a crank pin 114 projecting upwardly therefrom. A crank arm 116 is pivotally connected between the crank pin 114 and one end of bell crank 118 which bell crank is keyed to a shaft 120 that is journalled on the frame 45 of the machine. The bell crank 118 includes a loader actuating arm 122 which has its free end pivotally connected to the mandrel loader 28 by a link 124. The timing is such that after a mandrel 20 has been indexed at the feed station in carton receiving position, and after the suction head 24 has discharged a squared carton on the table 26 and the pivotal gate 30 has pivoted into squaring position as shown in FIGURE 7, the mandrel loader 28 is actuated to thereby move the loader from position C (FIG. 3) to position D moving the squared carton past the aligning jam detector 10 and onto the mandrel 20 if the carton is properly aligned.

The machine thus far described is substantially the same and operates in the same manner as that disclosed in the subject Vadas et al. application. The aligning jam detector 10 (FIGS. 4–8) of the present invention cooperates with the parts of the machine thus far described and serves to both aid in aligning the carton as well as stop the machine in the event the cartons avoid alignment.

The aligning jam detector 10 comprises an inverted generally U-shaped tunnel 130 which straddles the transfer table 26 and is pivotally connected thereto at its lower end by capscrews 132. The tunnel 130 includes an upper horizontal body 134 having a carton aligning surface 136 thereon which slopes downwardly and toward the mandrel 20 aligned therewith. A pair of grooves 138 are formed in the body 134 to accommodate the pusher bolts 78 of the carton loader 28 when the loader has moved a carton onto the mandrel and is disposed in the position indicated in solid lines in FIGURE 3.

In order to resist pivotal movement of the aligning jam detector 10 when a carton is being pushed therepast, a compression spring 140 is supported by a bolt 142 which extends through a hole in the body 134 and is secured in a threaded hole in the upper guide 66. The spring is disposed between the body 134 and a washer 144 which is held in adjusted position on the bolt 142 by a nut 146. The bolt is locked in adjusted position on the upper guide 66 by a lock nut 148. It will be understood that the tension of the spring 140 may be adjusted so as to resist pivotal movement of the tunnel 130 a desired amount by movement of either of the nuts 146 or 148. Thus, the spring 140 may be adjusted to vary the force exerted by a misaligned carton which is necessary for pivoting the tunnel 130 out of the aligning position shown in FIGURE 4.

A normally closed limit switch 150 is mounted on a bracket 152 secured to the side plate 68 and is normally spaced from but disposed in position to be engaged by and opened in the event a carton resists alignment by the aligning jam detector and exerts a force toward the right (FIG. 4) which is sufficient to overcome the force of the spring. When a misaligned carton avoids alignment and opens the switch 150 (FIG. 3), the motor 82, which receives power from main lines L1 and L2 of a control circuit 154 is immediately de-energized thereby deactivating the carton erecting and loading mechanism 12 until the misaligned carton is manually removed from the mechanism and the motor is again started. As mentioned previously, another aligning jam detector is associated with a carton erecting and loading mechanism (not shown) for loading cartons on the lower series 18 of mandrels 20. This detector is identical to the detector 10, and when a carton which is being pushed onto the associated lower mandrel avoids alignment, a normally closed switch 150a (FIG. 3), which is is series with the switch 150, opens to break the circuit to the motor 82 thereby immediately de-energizing the motor.

From the foregoing description it is apparent that the aligning jam detector of the present invention serves to aid in aligning cartons being pushed therethrough as well as serving its prime function of deactivating the drive motor in the event the carton avoids alignment. The detector also features a movable body having a carton aligning surface which is held in aligning position by resilient means that may be adjusted to resiliently resist, with a predetermined force, movement of the body to the active motor deactivating position.

While one embodiment of the present invention has been shown and described, it will be understood that various changes and modifications may be made without departing from the spirit of the invention or the scope of the appended claims.

The present invention and the manner in which the same is to be used having thus been described, what is claimed as new and desired to be protected by Letters Patent is:

1. In a carton forming and filling machine the combination of a guideway for receiving an open ended tubular container, means for pushing the container along a predetermined path defined by said guideway, container receiving means for receiving the container from said guideway, means for driving said pusher means, movable jam detecting means disposed along said guideway immediately adjacent said receiving means for allowing the lined containers to move therepast undisturbed and for engaging and moving with grossly misaligned containers, and control means connected to said drive means and responsive to the movement of said jam detector for deactivating said drive means upon detection of a grossly misaligned container, said movable jam detector including means for engaging and moving partially misaligned containers into alignment.

2. In a container supporting and filling machine the combination of means for supporting a container, guide means for maintaining the container in a substantially squared condition, container receiving means disposed in alignment with said squaring means for receiving the squared container from said guide means, pusher means for engaging the squared contained and for sliding the container along a predetermined path into said receiving means, means for intermittently driving said pusher means, movable jam detecting means disposed adjacent said path for allowing aligned container to move therepast undisturbed and for engaging and moving with grossly misaligned containers, and control means connected to said drive means and responsive to the movement of said detector for deactivating said drive means upon detection of a grossly misaligned container, said movable jam detector including means for engaging and moving partially misaligned containers into alignment.

3. In a carton forming and filling machine a combination of a guideway for receiving an open ended tubular container, means for pushing the container along a predetermined path defined by said guideway, container receiving means for receiving the container from said guideway, mean for driving said pusher means, movable jam detecting means disposed along said guideway immediately adjacent said receiving means for allowing aligned container to move therepast undisturbed and for engaging and moving with grossly misaligned containers, and control means connected to said drive means and responsive to the movement of said jam detector for deactivating said drive means upon detection of a grossly misaligned container, said movable jam detecting means including a container guiding surface which is disposed adjacent said path of movement of said container and is beveled toward the receiving means in the direction of movement of the container, said guiding surface engaging partially misaligned containers and arranged to cam the containers into alignment with said receiving means.

4. In a container supporting and filling machine a combination of means for supporting a container, guide means for maintaining the container in a substantially squared condition, container receiving means disposed in alignment with said squaring means for receiving the squared container from said guide means, pusher means for engaging the squared container and for sliding the container along a predetermined path onto said receiving means, means for intermittently driving said pusher means, movable jam detecting means disposed adjacent said path for allowing aligned container to move therepast undisturbed and for engaging and moving with grossly misaligned containers, and control means connected to said drive means and responsive to the movement of said detector for deactivating said drive means upon detection of a grossly misaligned container, said movable jam detecting means including resilient means for resiliently resisting movement of said jam detecting means in the direction of movement of containers whereby partially misaligned containers may engage said jam detecting means and be cammed into alignment without causing movement of said detecting means.

5. A machine according to claim 4 wherein means are provided for adjusting the resilient means for varying the resilient force which resists movement of said jam detecting means.

6. In a container supporting and filling machine the combination of means for supporting a container, guide means for maintaining the container in a substantially squared condition, container receiving means disposed in alignment with said squaring means for receiving the squared container from said guide means, pusher means for engaging the squared container and for sliding the container along a predetermined path onto said receiving means, means for intermittently driving said pusher means, movable jam detecting means disposed adjacent said path for allowing aligned containers to move therepast undisturbed and for engaging and moving with grossly misaligned containers, and control means connected to said drive means and responsive to the movement of said detector for deactivating said drive means upon detection of a grossly misaligned container, said movable jam detecting means including a U-shaped tunnel pivotally connected to said supporting means at its lower end, a body portion of said tunnel disposed above the path of movement of properly aligned containers, and a container aligning camming surface on said body directed downwardly and toward the receiving means and adapted to align and guide partially misaligned containers onto said receiving means, said body portion being contacted and detected by grossly misaligned containers which avoid misalignment.

7. A machine according to claim 6 and additionally comprising means secured to said support means and disposed at a point between said receiving means and said jam detecting means, a bolt secured to said guide means and operatively connected to said body portion to limit the physical movement of said tunnel in a direction opposite from the direction of movement of said containers and permitting movement of said body portion in the other direction, a helical compression spring carried by said bolt and having one end thereof engaging said body, and a nut on said bolt and arranged to hold the other end of said spring movement, said nut being movable to desired adjusted positions on said bolt to increase or decrease the resilient force acting to prevent pivotal movement of said tunnel in the event said body is engaged by a misaligned container.

References Cited

UNITED STATES PATENTS

| | | | |
|---|---|---|---|
| 3,322,043 | 5/1967 | Vergobbi | 93—44.1 X |
| 3,248,841 | 5/1966 | Heffelfinger et al. | 93—44.1 X |

WILLIAM S. LAWSON, *Primary Examiner.*

U.S. Cl. X.R.

53—67, 78; 93—44.1

PO-1050
(5/69)

UNITED STATES PATENT OFFICE
CERTIFICATE OF CORRECTION

Patent No. 3,452,651          Dated July 1, 1969

Inventor(s) L. VADAS ET AL

It is certified that error appears in the above-identified patent and that said Letters Patent are hereby corrected as shown below:

Column 5, line 66, change "contained" to -- container --. Column 6, line 8, change "mean" to -- means --. Column 7, line 11, insert the word "from" after the word "spring".

SIGNED AND
SEALED
NOV 17 1970

(SEAL)
Attest:

Edward M. Fletcher, Jr.
Attesting Officer

WILLIAM E. SCHUYLER, JR.
Commissioner of Patents